US012750118B2

(12) United States Patent
Ling et al.

(10) Patent No.: US 12,750,118 B2
(45) Date of Patent: Sep. 29, 2026

(54) METHODS AND APPARATUSES FOR BEAM FAILURE RECOVERY (BFR) TRANSMISSION

(71) Applicant: Lenovo (Beijing) Limited, Beijing (CN)

(72) Inventors: Wei Ling, Beijing (CN); Chenxi Zhu, Beijing (CN); Bingchao Liu, Beijing (CN); Yi Zhang, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 355 days.

(21) Appl. No.: 18/290,195

(22) PCT Filed: May 11, 2021

(86) PCT No.: PCT/CN2021/093111

§ 371 (c)(1),
(2) Date: Nov. 10, 2023

(87) PCT Pub. No.: WO2022/236699

PCT Pub. Date: Nov. 17, 2022

(65) Prior Publication Data

US 2024/0357597 A1 Oct. 24, 2024

(51) Int. Cl.
*H04B 7/06* (2006.01)
*H04W 72/21* (2023.01)

(52) U.S. Cl.
CPC ........ *H04B 7/06964* (2023.05); *H04W 72/21* (2023.01)

(58) Field of Classification Search
CPC ........................... H04B 7/0408; H04B 7/0695; H04B 7/06952; H04B 7/06956; H04B 7/06958;

(Continued)

(56) References Cited

U.S. PATENT DOCUMENTS 11,843,502 B2 * 12/2023 Zhou .................. H04B 7/06964
11,943,037 B2 * 3/2024 Zhu .................... H04B 7/06964

(Continued)

FOREIGN PATENT DOCUMENTS

WO 2020151472 A1 7/2020
WO 2020263050 A1 12/2020

OTHER PUBLICATIONS

"Communication Pursuant to Rule 164(1) EPC", EP Application No. 21941274.9, Dec. 11, 2024, 16 pages.

(Continued)

*Primary Examiner* — Frank Duong
(74) *Attorney, Agent, or Firm* — FIG. 1 Patents

(57) ABSTRACT

The present application relates to methods and apparatuses for beam failure recovery (BFR) transmission. An embodiment of the present disclosure provides a method performed by a user equipment (UE), including: receiving first configuration information configuring a plurality of beam failure detection reference signal (BFD-RS) sets for a first set of cells, wherein each cell of the first set of cells is configured with two BFD-RS sets: receiving second configuration information configuring two physical uplink control channel scheduling request (PUCCH-SR) resources, wherein the two PUCCH-SR resources comprise a first PUCCH-SR resource and a second PUCCH-SR resource; and when at least one BFD-RS set of the plurality of BFD-RS sets is failed, selecting a PUCCH-SR resource from the two PUCCH-SR resources for transmitting a positive link recovery request (LRR) of the first set of cells based at least in part on whether two BFD-RS sets are configured for a first cell in which the two PUCCH-SR resources are configured to be transmitted.

20 Claims, 5 Drawing Sheets

(58) Field of Classification Search
CPC .............. H04B 7/0696; H04B 7/06962; H04B 7/06964; H04B 7/06966; H04B 7/088; H04L 5/0023; H04L 5/0048; H04L 5/0051; H04W 72/04; H04W 72/046; H04W 72/21; H04W 72/23; H04W 76/18
See application file for complete search history.

(56) References Cited

U.S. PATENT DOCUMENTS

| | | | | |
|---|---|---|---|---|
| 12,074,680 | B2 * | 8/2024 | Zhou | H04W 72/046 |
| 12,185,404 | B2 * | 12/2024 | Tsai | H04B 7/06964 |
| 12,289,625 | B2 * | 4/2025 | Koskela | H04W 24/04 |
| 2020/0350972 | A1 * | 11/2020 | Yi | H04B 7/088 |
| 2021/0021329 | A1 | 1/2021 | Zhang et al. | |
| 2021/0050968 | A1 | 2/2021 | Yi et al. | |
| 2021/0135740 | A1 | 5/2021 | Zhou et al. | |
| 2022/0104036 | A1 * | 3/2022 | Zhou | H04W 24/04 |
| 2022/0302988 | A1 * | 9/2022 | Bai | H04B 7/0695 |
| 2022/0311501 | A1 * | 9/2022 | Koskela | H04B 7/088 |
| 2023/0198602 | A1 * | 6/2023 | Zeineddine | H04B 7/06964 370/329 |

OTHER PUBLICATIONS

"Extended European Search Report", EP Application No. 21941274.9, Mar. 4, 2025, 14 pages.

Asia Pacific Telecom, "Discussion of enhancements on beam management for Multi-TRP", 3GPP TSG RAN WG1 #104b-e, R1-2102727, e-Meeting [retrieved Jan. 1, 2024]. Retrieved from the Internet <https://www.3gpp.org/ftp/TSG_RAN/WG1_RL1/TSGR1_104b-e/Docs/>, Apr. 2021, 7 pages.

Mediatek Inc., "Enhancement on beam management for multi-TRP", 3GPP TSG RAN WG1 #104b-e, R1-2102677, e-Meeting [retrieved Jan. 1, 2024]. Retrieved from the Internet <https://www.3gpp.org/ftp/tsg_ran/WG1_RL1/ TSGR1_104b-e/Docs>, Apr. 2021, 6 pages.

PCT/CN2021/093111, "International Preliminary Report on Patentability", PCT Application No. PCT/CN2021/093111, Nov. 23, 2023, 6 pages.

PCT/CN2021/093111, "International Search Report and Written Opinion", PCT Application No. PCT/CN2021/093111, Feb. 10, 2022, 7 pages.

* cited by examiner

METHODS AND APPARATUSES FOR BEAM FAILURE RECOVERY (BFR) TRANSMISSION

TECHNICAL FIELD

The present disclosure generally relates to wireless communication technology, and in particular to methods and apparatuses for beam failure recovery (BFR) transmission.

BACKGROUND OF THE INVENTION

Multiple transmission reception points (multi-TRP) transmission has been introduced into new radio (NR). Regarding multiple input multiple output (MIMO) in NR R17, it is proposed to enhance the support for multi-TRP deployment, targeting both frequency ranges 1 (FR1) and frequency ranges 2 (FR2). Specifically, it is proposed to evaluate and specify beam-management-related enhancements for simultaneous multi-TRP transmission with multi-panel reception.

When a user equipment (UE) detects a beam failure, the UE may trigger beam failure recovery (BFR). With multi-TRP being introduced, TRP-specific BFR is agreed to be supported in R17. Up to two dedicated physical uplink control channel scheduling request (PUCCH-SR) resources (i.e., one or two PUCCH-SR resources) can be configured for the TRP-specific BFR. Furthermore, there may also be other PUCCH-SR resource(s) configured for other BFR(s).

Accordingly, it is desirable to provide solutions for selecting a PUCCH-SR resource when there are two PUCCH-SR resources configured for TRP-specific BFR, and solutions for determining the priorities of different BFRs.

SUMMARY

Some embodiments of the present disclosure provide a method performed by a user equipment (UE). The method includes: receiving first configuration information configuring a plurality of beam failure detection reference signal (BFD-RS) sets for a first set of cells, wherein each cell of the first set of cells is configured with two BFD-RS sets; receiving second configuration information configuring two physical uplink control channel scheduling request (PUCCH-SR) resources, wherein the two PUCCH-SR resources include a first PUCCH-SR resource and a second PUCCH-SR resource; and when at least one BFD-RS set of the plurality of BFD-RS sets is failed, selecting a PUCCH-SR resource from the two PUCCH-SR resources for transmitting a positive link recovery request (LRR) of the first set of cells based at least in part on whether two BFD-RS sets are configured for a first cell in which the two PUCCH-SR resources are configured to be transmitted.

In an embodiment of the present disclosure, a BFD-RS set is failed when a radio link quality of each reference signal (RS) in the BFD-RS set is below a configured threshold.

In an embodiment of the present disclosure, selecting the PUCCH-SR resource includes selecting any of the two PUCCH-SR resources when: the first cell is not configured with two BFD-RS sets, or the first cell is configured with two BFD-RS sets, and both of the two BFD-RS sets configured for the first cell are not failed.

In an embodiment of the present disclosure, in the case that the second configuration information includes one scheduling request (SR) configuration configuring that each PUCCH-SR resource of the two PUCCH-SR resources is associated with a BFD-RS set of a first BFD-RS set and a second BFD-RS set, when the first cell is configured with a first BFD-RS set and a second BFD-RS set, and the first BFD-RS set is failed while the second BFD-RS set is not failed, selecting the PUCCH-SR resource includes selecting a PUCCH-SR resource associated with the second BFD-RS set.

In an embodiment of the present disclosure, in the case that the second configuration information includes a first SR configuration and a second SR configuration configuring the two PUCCH-SR resources, respectively, wherein the first SR configuration is associated with a first BFD-RS set and the second SR configuration is associated with a second BFD-RS set, when the first cell is configured with the first BFD-RS set and the second BFD-RS set, and the first BFD-RS set is failed while the second BFD-RS set is not failed, selecting the PUCCH-SR resource includes selecting the PUCCH-SR resource configured in the first SR configuration associated with the first BFD-RS set.

Some embodiments of the present disclosure provide a method performed by a user equipment (UE). The method includes: receiving configuration information configuring one or two physical uplink control channel scheduling request (PUCCH-SR) resources; determining a first PUCCH-SR resource from the one or two PUCCH-SR resources configured for transmitting a positive link recovery request (LRR) of a first set of cells, wherein each cell of the first set of cells is configured with two beam failure detection reference signal (BFD-RS) sets; and determining whether to transmit the first PUCCH-SR resource, or a second PUCCH-SR resource for transmitting a positive LRR of a second set of cells or for transmitting a positive scheduling request (SR) when the first PUCCH-SR resource and the second PUCCH-SR resource overlap in time domain, wherein each cell of the second set of cells is configured with one BFD-RS set.

In an embodiment of the present disclosure, determining whether to transmit the first PUCCH-SR resource or the second PUCCH-SR resource includes determining to transmit the first PUCCH-SR resource when the second PUCCH-SR resource is for transmitting the positive SR.

In an embodiment of the present disclosure, determining whether to transmit the first PUCCH-SR resource or the second PUCCH-SR resource includes determining to transmit the second PUCCH-SR resource when the second PUCCH-SR resource is for transmitting the positive LRR of the second set of cells and the first set of cells do not include a PCell or PScell.

In an embodiment of the present disclosure, determining whether to transmit the first PUCCH-SR resource or the second PUCCH-SR resource includes determining whether to transmit the first PUCCH-SR resource or the second PUCCH-SR resource based on a lowest cell index of the first set of cells and the second set of cells when the second PUCCH-SR resource is for transmitting the positive LRR of the second set of cells and the first set of cells do not include a PCell or PScell.

In an embodiment of the present disclosure, determining whether to transmit the first PUCCH-SR resource or the second PUCCH-SR resource includes determining whether to transmit the first PUCCH-SR resource or the second PUCCH-SR resource based on a lowest cell index of a first subset of the first set of cells and a second subset of the second set of cells when the second PUCCH-SR resource is for transmitting the positive LRR of the second set of cells, and the first set of cells do not include a PCell or PScell or two BFD-RS sets configured for the PCell or PScell are not failed, wherein at least one BFD-RS set configured for each cell of the first subset is failed, and the BFD-RS set configured for each cell of the second subset is failed.

In an embodiment of the present disclosure, determining whether to transmit the first PUCCH-SR resource or the second PUCCH-SR resource includes determining to transmit the second PUCCH-SR resource when the second PUCCH-SR resource is for transmitting the positive LRR of the second set of cells and the first set of cells include a PCell or PScell and two BFD-RS sets configured for the PCell or PScell are not failed.

In an embodiment of the present disclosure, determining whether to transmit the first PUCCH-SR resource or the second PUCCH-SR resource includes determining to transmit the first PUCCH-SR resource when the second PUCCH-SR resource is for transmitting the positive LRR of the second set of cells and the first set of cells include a PCell or PScell.

In an embodiment of the present disclosure, determining whether to transmit the first PUCCH-SR resource or the second PUCCH-SR resource includes determining to transmit the first PUCCH-SR resource when the second PUCCH-SR resource is for transmitting the positive LRR of the second set of cells and the first set of cells include a PCell or PScell and at least one BFD-RS set configured for the PCell or PScell is failed.

Some embodiments of the present disclosure provide a method performed by a base station (BS). The method includes: transmitting first configuration information configuring a plurality of beam failure detection reference signal (BFD-RS) sets for a first set of cells, wherein each cell of the first set of cells is configured with two BFD-RS sets; transmitting second configuration information configuring one or two physical uplink control channel scheduling request (PUCCH-SR) resources; and receiving a positive link recovery request (LRR) or a positive scheduling request (SR) with the one or two PUCCH-SR resources when at least one BFD-RS set of the plurality of BFD-RS sets is failed.

Some embodiments of the present disclosure provide an apparatus. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer-executable instructions, when executed, cause the processor to implement a method according to any embodiment of the present disclosure with the receiving circuitry and the transmitting circuitry.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only exemplary embodiments of the present disclosure and are not therefore intended to limit the scope of the present disclosure.

DETAILED DESCRIPTION

Figure 1:
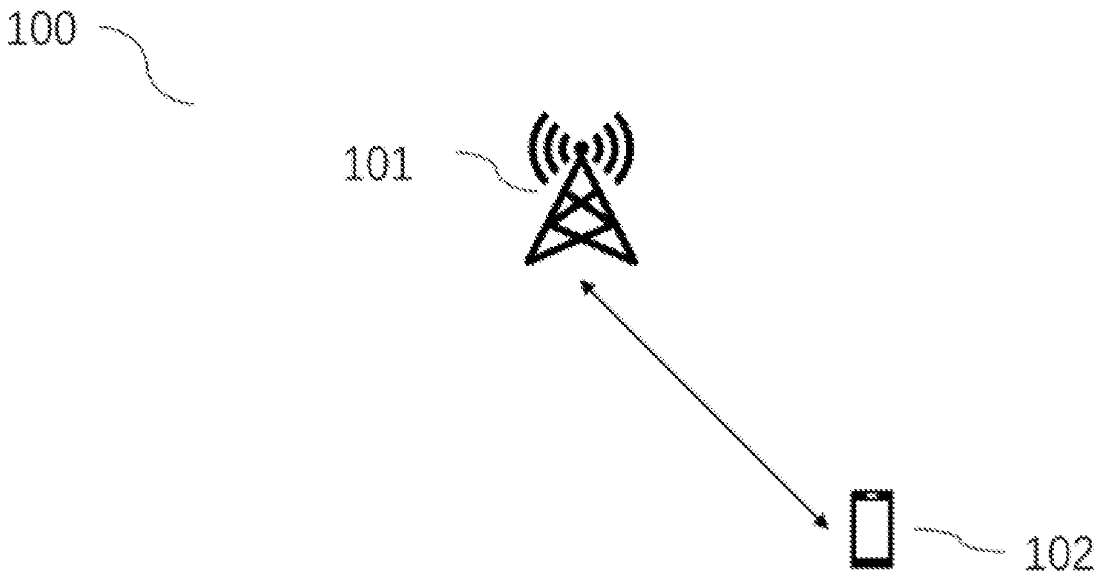
FIG. 1 illustrates a schematic diagram of an exemplary wireless communication system in accordance with some embodiments of the present disclosure.

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

While operations are depicted in the drawings in a particular order, persons skilled in the art will readily recognize that such operations need not be performed in the particular order shown or in sequential order, or that among all illustrated operations be performed, to achieve desirable results, sometimes one or more operations can be skipped. Further, the drawings can schematically depict one or more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing can be advantageous.

FIG. 1 illustrates a schematic diagram of an exemplary wireless communication system 100 in accordance with some embodiments of the present application.

As shown in FIG. 1, the wireless communication system 100 includes a UE 102 and a BS 101. Although merely one BS is illustrated in FIG. 1 for simplicity, it is contemplated that the wireless communication system 100 may include more BSs in some other embodiments of the present application. Similarly, although merely one UE is illustrated in FIG. 1 for simplicity, it is contemplated that the wireless communication system 100 may include more UEs in some other embodiments of the present application.

The BS 101 may also be referred to as an access point, an access terminal, a base, a macro cell, a node-B, an enhanced node B (eNB), a gNB, a home node-B, a relay node, or a device, or described using other terminology used in the art. The BS 101 is generally part of a radio access network that may include a controller communicably coupled to the BS 101. Furthermore, the BS 101 may be configured with one TRP (or panel) or more TRPs (or panels). A TRP can act like a small BS.

In a wireless communication system, a single TRP can be used to serve one or more UEs under control of a BS. In different scenarios, TRP may be referred to as different terms. Persons skilled in the art should understand that as the 3rd generation partnership project (3GPP) and the communication technology develop, the terminologies recited in the specification may change, which should not affect the scope of the present application. It should be understood that the TRP(s) (or panel(s)) configured for the BS may be transparent to a UE.

The UE 102 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE 102 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 102 may include wearable devices, such as smart watches, fitness bands, optical head-mounted displays, or the like. Moreover, the UE 102 may be referred to as a subscriber unit, a mobile, a mobile station, a user, a terminal, a mobile terminal, a wireless terminal, a fixed terminal, a subscriber station, a user terminal, or a device, or described using other terminology used in the art.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, a long term evolution (LTE) network, a 3GPP-based network, a 3GPP 5G network, a satellite communications network, a high-altitude platform network, and/or other communications networks.

In one embodiment, the wireless communication system 100 is compatible with the 5G new radio (NR) of the 3GPP protocol, wherein the BS 102 transmits data using an orthogonal frequency division multiplexing (OFDM) modulation scheme on the downlink and the UE 102 transmits data on the uplink using a single-carrier frequency division multiple access (SC-FDMA) or OFDM scheme. More generally, the wireless communication system 100 may implement some other open or proprietary communication protocols, for example, WiMAX, among other protocols.

In other embodiments, the BS 101 may communicate using other communication protocols, such as the IEEE 802.11 family of wireless communication protocols. Further, in some embodiments, the BS 101 may communicate over licensed spectrums, whereas in other embodiments the BS 101 may communicate over unlicensed spectrums. The present disclosure is not intended to be limited to the implementation of any particular wireless communication system architecture or protocol. In another embodiment, the BS 101 may communicate with the UE 102 using the 3GPP 5G protocols.

In response to detecting a number of beam failure instances, a UE may initiate a BFR procedure. For a communication system with multiple TRPs, the BFR may be specific for a TRP, which is referred to as TRP-specific BFR.

Each TRP is configured with one beam failure detection reference signal (BFD-RS) set per cell. In other words, one TRP corresponds to or is associated with one BFD-RS set. Therefore, different BFD-RS set indexes can be used to distinguish different TRPs in a cell. When a UE detects that all beams in a BFD-RS set are failed, which means the TRP associated with the BFD-RS set is failed in the cell, the UE may transmit a positive link recovery request (LRR) with a PUCCH-SR resource (also referred to as "transmitting a PUCCH-SR resource" herein) to trigger a media access control control element (MAC CE) report for TRP-specific BFR. The MAC CE report for TRP-specific BFR may indicate the cell index of the failed TRP and the TRP index. The MAC CE report for TRP-specific BFR may also indicate the corresponding new beam when it can be found. When no new beam can be found, the MAC CE report for TRP-specific BFR may include no new beam indication.

The BFD-RS set may be configured in any cell since any cell may be configured with TRP-specific BFR. However, the PUCCH-SR resource(s) can only be configured in the primary cell (PCell), the primary secondary cell (PSCell), or the PUCCH-SCell (a secondary cell (Scell) that is configured with PUCCH).

For a UE configured with two PUCCH-SR resources in a cell group, when beam failure is detected in one or more of BFD-RS sets configured in one or more cells, the UE may select one PUCCH-SR resource from the two PUCCH-SR resources by taking the above into consideration.

Furthermore, the UE may also be configured with SCell BFR, and the UE may be configured with a PUCCH-SR resource, other than the one or two PUCCH-SR resources for TRP-specific BFR, for transmitting a positive LRR of SCell BFR. Besides, there may be other PUCCH-SR resource(s) configured for normal SR which is (are) for transmitting a positive normal SR (also referred to as "positive SR"). It is possible that a PUCCH-SR resource for transmitting the positive LRR of SCell BFR or the positive SR may overlap in time domain with the PUCCH-SR resource selected from the one or two PUCCH-SR resources for transmitting the positive LRR of TRP-specific BFR. Therefore, one PUCCH-SR resource needs to be dropped and the other PUCCH-SR resource is transmitted. The present disclosure also provides solutions for determining the priorities of the positive LRR of SCell BFR, the positive LRR of TRP-specific BFR, and the positive SR.

According to the agreement in R17, when TRP-specific BFR is configured for a cell, there are two BFD-RS sets configured for this cell. Each of the two BFD-RS sets configured in a cell can identify a TRP in the cell. Since there are two BFD-RS sets, they can identify two TRPs. One or two PUCCH-SR resources can be configured for TRP-specific BFR, and the one or two PUCCH-SR resources can be configured to be transmitted in the PCell, the PScell, or the PUCCH-SCell.

The UE may monitor radio link qualities of all reference signals (RSs) in the BFD-RS sets configured for a set of cells. When the radio link qualities of all RSs in one BFD-RS set are all below a threshold, that is, the radio link quality of each RS in the BFD-RS set is below a threshold, the BFD-RS set is considered as failed. The threshold may be a predefined threshold, or a threshold configured by radio resource control (RRC) signaling.

Supposing that there are a total number of M cells in the set of cells and each cell in the M cells is configured with TRP-specific BFR, i.e., two BFD-RS sets are configured for each cell, there are 2×M BFD-RS sets configured for the set of cells.

In the case that two PUCCH-SR resources are configured for the TRP-specific BFR for the set of cells, when the UE detects that at least one BFD-RS set of the BFD-RS sets configured for the set of cells is failed, the UE may select a PUCCH-SR resource from the two PUCCH-SR resources for transmitting a positive LRR of TRP-specific BFR. There are different cases for selecting a PUCCH-SR resource from the two PUCCH-SR resources, which are listed in the following Table 1.

TABLE 1

| different cases for selecting a PUCCH-SR resource | |
|---|---|
| | cell A (where the two PUCCH-SR resources are configured to be transmitted) |
| Case 1 | no two BFD-RS sets configured |
| Case 2 | two BFD-RS sets configured, wherein neither is failed |
| Case 3 | two BFD-RS sets configured, wherein one is failed and the other is not failed |
| Case 4 | two BFD-RS sets configured, wherein both are failed |

For each of the above four cases, the PUCCH-SR resource can be selected as follows according to some embodiments of the present disclosure.

Case 1: the cell A where the two PUCCH-SR resources configured to be transmitted is not configured with TRP-specific BFR, in other words, the cell A is not configured with two BFD-RS sets.

For case 1, when two PUCCH-SR resources are configured for TRP-specific BFR for the set of cells, and at least one BFD-RS set in the 2×M BFD-RS sets is failed, the UE may select any one of the two PUCCH-SR resources based on the UE's implementation.

Case 2: the cell A where the two PUCCH-SR resources configured to be transmitted is configured with TRP-specific BFR, i.e., two BFD-RS sets are configured for the cell A, and neither one of the two BFD-RS sets is failed.

For case 2, when two PUCCH-SR resources are configured for TRP-specific BFR for the set of cells, and at least one BFD-RS set in the 2×M BFD-RS sets is failed, the UE may select any one of the two PUCCH-SR resources based on the UE's implementation.

Case 3: the cell A where the two PUCCH-SR resources configured to be transmitted is configured with TRP-specific BFR, i.e., two BFD-RS sets are configured for the cell A, and one BFD-RS set is failed while the other BFD-RS set is not failed.

Two solutions are proposed for selecting the PUCCH-SR resource for case 3.

Solution 3-1: the two PUCCH-SR resources are configured in one SR configuration, each PUCCH-SR resource of the two PUCCH-SR resources is associated with a TRP identifier (ID), and each PUCCH-SR resource is transmitted to a TRP with the associated TRP ID.

For example, the two PUCCH-SR resources are PUCCH-SR resource 1 and PUCCH-SR resource 2, and the two TRPs are TRP 1 and TRP 2. The SR configuration configures that PUCCH-SR resource 1 is associated with TRP 1, and PUCCH-SR resource 2 is associated with TRP 2. PUCCH-SR resource 1 is transmitted to TRP 1, and PUCCH-SR resource 2 is transmitted to TRP 2.

The above TRP IDs, i.e. 1 or 2, are only non-limiting instances of the IDs for TRPs. The TRP ID may be indicated by other parameters, for example:

1) the index of the CORESET pool, which may be represented with a CORESETPoolIndex value,
2) the index of the CORESET group, which may be represented with a CORESETGroupIndex value, or
3) the index of a BFD-RS set which is configured in the cell A.

When there are two CORESETPoolIndex values or two CORESETGroupIndex values configured in the cell, there is a one to one association between each of the two CORESETPoolIndex values or two CORESETGroupIndex values, and each of the two BFD-RS sets configured in the cell A by RRC signalling or a predefined rule.

For example, the RRC signaling may configure that the first CORESETPoolIndex value or the first CORESETGroupIndex value corresponds to the first BFD-RS set, and the second CORESETPoolIndex value or the second CORESETGroupIndex value corresponds to the BFD-RS set.

In this way, each PUCCH-SR resource is associated with one BFD-RS set of the two BFD-RS sets which are configured in the cell A.

Accordingly, when one BFD-RS set of the two BFD-RS sets configured in the cell A is failed, and the other BFD-RS set is not failed, the PUCCH-SR resource associated with the BFD-RS set which is not failed is selected for transmitting a positive LRR of the TRP-specific BFR.

Solution 3-2: the two PUCCH-SR resources are configured in two SR configurations, respectively, each SR configuration is associated with a TRP ID, and each PUCCH-SR resource configured in the SR configuration is transmitted to a TRP identified by the other TRP ID.

For example, the two PUCCH-SR resources are PUCCH-SR resource 1 and PUCCH-SR resource 2 which are configured in SR configuration 1 and SR configuration 2 respectively, and the two TRPs are TRP 1 and TRP 2. And SR configuration 1 and SR configuration 2 are associated with TRP 1 and TRP 2 respectively by RRC configuration or a predefined rule, which means that PUCCH-SR resource 1 is transmitted to TRP 2 and PUCCH-SR resource is transmitted to TRP 1.

Similarly, the TRP ID may be indicated by other parameters in a similar fashion as solution 3-1. Since the first SR configuration is associated with TRP 1, it is also associated with a first BFD-RS set of the two BFD-RS sets which is associated with TRP 1. Since the second SR configuration is associated with TRP 2, it is also associated with a second BFD-RS set of the two BFD-RS sets which is associated with TRP 2. That is, each SR configuration is associated with one BFD-RS set of the two BFD-RS sets which are configured in the cell A.

Accordingly, when one BFD-RS set of the two BFD-RS sets configured in the cell A is failed, and the other BFD-RS set is not failed, the PUCCH-SR resource configured in the SR configuration associated with the BFD-RS set which is failed is selected for transmitting a positive LRR of the TRP-specific BFR. In other words, the PUCCH-SR resource is transmitted to the non-failed TRP.

Case 4: the cell A where the two PUCCH-SR resources configured to be transmitted is configured with TRP-specific BFR, i.e., two BFD-RS sets are configured for the cell A, and both BFD-RS sets are failed.

In this case, when the cell A is a PCell or a PScell, the UE may perform random access channel (RACH) based BFR. For example, when a cell-specific beam failure recovery request (BFRQ) is configured in the PCell or the PScell, the UE may transmit a RACH resource determined from the RACH resources configured for PCell or PScell BFR selected according to a new beam; otherwise, the UE may transmit a RACH resource for initial random access.

When the cell A is a PUCCH-SCell, and the cell A is also configured with Scell BFR (one BFD-RS set is configured for the cell A), the UE may perform the SCell BFR.

In some embodiments of the present disclosure, for case 4, the UE may select any one of the two PUCCH-SR resources for transmitting a positive LRR of the TRP-specific BFR when cell-specific BFR is not configured in the cell A where the two PUCCH-SR resources are configured to be transmitted.

As discussed above, the UE may select or determine a PUCCH-SR resource from two configured PUCCH-SR resources for transmitting a positive LRR of the TRP-specific BFR. It should be noted that the above solutions for selecting a PUCCH-SR resource also apply when more than two PUCCH-SR resources are configured for TRP-specific BFR. It should also be noted that in the cases that only one PUCCH-SR resource is configured for TRP-specific BFR, the UE always determines this PUCCH-SR resource for transmitting a positive LRR of the TRP-specific BFR. Hereinafter, the determined PUCCH-SR resource for TRP-specific BFR (no matter whether it is selected from a plurality of configured PUCCH-SR resources or it is the only one configured PUCCH-SR resource) is referred to as PUCCH-SR resource 1.

There may also be other PUCCH-SR resource(s), which is (are) for positive SR or positive LRR of SCell BFR. Hereinafter, the PUCCH-SR resource(s) for positive SR or positive LRR of SCell BFR is (are) referred to as PUCCH-SR resource 2.

The PUCCH-SR resource 1 and PUCCH-SR resource 2 may overlap in time domain. When they overlap in time domain, only one PUCCH-SR resource can be transmitted. Therefore, it is needed to determine the priorities of the positive SR, the positive LRR of SCell BFR, and the positive LRR of TRP-specific BFR.

Similar to the positive LRR of SCell BFR, the priority of the positive LRR of TRP-specific BFR is higher than that of the positive SR. Therefore, when PUCCH-SR resource 1 for the positive LRR of TRP-specific BFR and PUCCH-SR resource 2 for the positive normal SR overlap in time domain, the PUCCH-SR resource 1 for the positive LRR of TRP-specific BFR is transmitted, and PUCCH-SR resource 2 for the positive SR is dropped.

When SCell BFR is configured for a first set of cells (each cell of the first set of cells is configured with one BFD-RS set), TRP-specific BFR is configured for a second set of cells (each cell of the second set of cells is configured with two BFD-RS set), and a PUCCH-SR resource configured for SCell BFR is in the same cell as the PUCCH resource(s) configured for TRP-specific BFR, the priorities of positive LRR of TRP-specific BFR and positive LRR of SCell BFR are determined differently according to different scenarios as listed in the following Table 2 when the PUCCH-SR resource for transmitting positive the positive LRR of SCell BFR and the determined PUCCH-SR resource for transmitting the positive LRR of TRP-specific BFR overlap in time domain.

TABLE 2 different scenarios for priority determination

| | TRP-specific BFR |
|---|---|
| Scenario 1 | not configured in PCell or PScell |
| Scenario 2 | configured in PCell or PScell, with both BFD-RS sets not failed |
| Scenario 3 | configured in PCell or PScell, with at least one BFD-RS set failed |

Scenario 1: TRP-specific BFR is not configured in the PCell or the PScell (i.e., the second set of cells does not include the PCell or the PScell), which means that the PCell or the PScell is not configured with two BFD-RS sets.

In scenario 1, the priority of the positive LRR of SCell BFR and the priority of the positive LRR of TRP-specific BFR may be determined based on the following options:

Option 1-1: the priority of the positive LRR of SCell BFR is higher than the priority of the positive LRR of TRP-specific BFR. Therefore, when PUCCH-SR resource 1 and PUCCH-SR resource 2 overlap in time domain, PUCCH-SR resource 2, which is used for transmitting the positive LRR of SCell BFR, is transmitted, and PUCCH-SR resource 1 is dropped.

Option 1-2: the priority of positive LRR of SCell BFR and the priority of the positive LRR of TRP-specific BFR are determined based on the indexes of the cells in the first set and the second set. Specifically, the positive LRR for the set of cells which include a cell having the lowest cell index among all the cells in the first set and the second set has the higher priority.

For example, the first set of cells includes: cell 3, cell 4 and cell 5, and the second set of cells includes cell 1, cell 2 and cell 6. The lowest cell index is 1, which is included in the second set of cells. Therefore, the positive LRR of TRP-specific BFR has a higher priority. In such case, when PUCCH-SR resource 1 and PUCCH-SR resource 2 overlap in time domain, PUCCH-SR resource 1 is transmitted, and PUCCH-SR resource 2 is dropped.

Option 1-3: the priority of positive LRR of SCell BFR and the priority of the positive LRR of TRP-specific BFR are determined based on the indexes of the cells having beam failure in the first set and the second set. Specifically, the positive LRR for the set of cells which includes a cell having beam failure having the lowest cell index among all the cells having beam failure in the first set and the second set has the higher priority. In other words, a first subset of the first set of cells includes cell(s) having Scell beam failure, which means that the BFD-RS set configured for each cell in the first subset is failed; a second subset of the second set of cells includes cell(s) having TRP-specific beam failure, which means that at least one of the BFD-RS sets configured for each cell in the second subset is failed; the priority of positive LRR of SCell BFR and the priority of the positive LRR of TRP-specific BFR are determined based on the lowest index in the first subset and the second subset.

For example, the first subset of cells having SCell beam failure includes: cell 1, cell 3 and cell 5, and the second subset of cells having TRP-specific beam failure includes cell 2 and cell 4. The lowest cell index is 1, which is included in the first subset of cells. Therefore, the positive LRR of SCell BFR has a higher priority. In such case, when PUCCH-SR resource 1 and PUCCH-SR resource 2 overlap in time domain, PUCCH-SR resource 2 is transmitted, and PUCCH-SR resource 1 is dropped.

Option 1-4: no priority is determined, and it is up to the UE's implementation to determine which PUCCH-SR resource is to be transmitted. That is, when PUCCH-SR resource 1 and PUCCH-SR resource 2 overlap in time domain, the UE may select PUCCH-SR resource 1 or PUCCH-SR resource 2 to be transmitted based on the UE's implementation.

Scenario 2: TRP-specific BFR is configured in the PCell or the PScell (i.e., the second set of cells includes the PCell or the PScell), which means two BFD-RS sets are configured in the PCell or the PScell. Furthermore, both BFD-RS sets are not failed.

In scenario 2, the priority of the positive LRR of SCell BFR and the priority of the positive LRR of TRP-specific BFR may be determined based on the following options:

Option 2-1: the priority of the positive LRR of SCell BFR is higher than the priority of the positive LRR of TRP-specific BFR. Accordingly, when PUCCH-SR resource 1 and PUCCH-SR resource 2 overlap in time domain, PUCCH-SR resource 2 is determined to be transmitted while PUCCH-SR resource 1 is dropped.

Option 2-2: the priority of the positive LRR of SCell BFR is lower than the priority of the positive LRR of TRP-specific BFR. Accordingly, when PUCCH-SR resource 1 and PUCCH-SR resource 2 overlap in time domain, PUCCH-SR resource 1 is determined to be transmitted while PUCCH-SR resource 2 is dropped.

Option 2-3: option 2-3 is similar to option 1-3, which is presented as follows:

The priority of positive LRR of SCell BFR and the priority of the positive LRR of TRP-specific BFR are determined based on the indexes of the cells having beam failure in the first set and the second set. Specifically, the positive LRR for the set of cells which includes a cell having beam failure having the lowest cell index among all the cells having beam failure in the first set and the second set has the higher priority. In other words, a first subset of the first set of cells includes cell(s) having Scell beam failure, which means that the BFD-RS set configured for each cell in the first subset is failed; a second subset of the second set of cells includes cell(s) having TRP-specific beam failure, which means that at least one of the BFD-RS sets configured for each cell in the second subset is failed; the priority of positive LRR of SCell BFR and the priority of the positive LRR of TRP-specific BFR are determined based on the lowest index in the first subset and the second subset.

For example, the first subset of cells having SCell beam failure includes: cell 1, cell 3 and cell 5, and the second subset of cells having TRP-specific beam failure includes cell 2 and cell 4. Then lowest cell index is 1, which is included in the first subset of cells. Therefore, the positive LRR of SCell BFR has a higher priority. In such case, when PUCCH-SR resource 1 and PUCCH-SR resource 2 overlap in time domain, PUCCH-SR resource 2 is transmitted, and PUCCH-SR resource 1 is dropped.

Option 2-4: no priority is determined, and it is up to the UE's implementation to determine which PUCCH-SR resource is to be transmitted. That is, when PUCCH-SR resource 1 and PUCCH-SR resource 2 overlap in time domain, the UE may select PUCCH-SR resource 1 or PUCCH-SR resource 2 to be transmitted based on the UE's implementation.

Scenario 3: TRP-specific BFR is configured in the PCell or the PScell (i.e., the second set of cells includes the PCell or the PScell), which means two BFD-RS sets are configured in the PCell or the PScell. Furthermore, at least one of the two BFD-RS sets is failed.

In scenario 3, the priority of the positive LRR of SCell BFR and the priority of the positive LRR of TRP-specific BFR may be determined based on the following options:

Option 3-1: the priority of the positive LRR of TRP-specific BFR is higher than the priority of the positive LRR of SCell BFR. Accordingly, when PUCCH-SR resource 1 and PUCCH-SR resource 2 overlap in time domain, PUCCH-SR resource 1 is determined to be transmitted while PUCCH-SR resource 2 is dropped.

Option 3-2: no priority is determined, and it is up to the UE's implementation to determine which PUCCH-SR resource is to be transmitted. That is, when PUCCH-SR resource 1 and PUCCH-SR resource 2 overlap in time domain, the UE may select PUCCH-SR resource 1 or PUCCH-SR resource 2 to be transmitted based on the UE's implementation.

Figure 2:
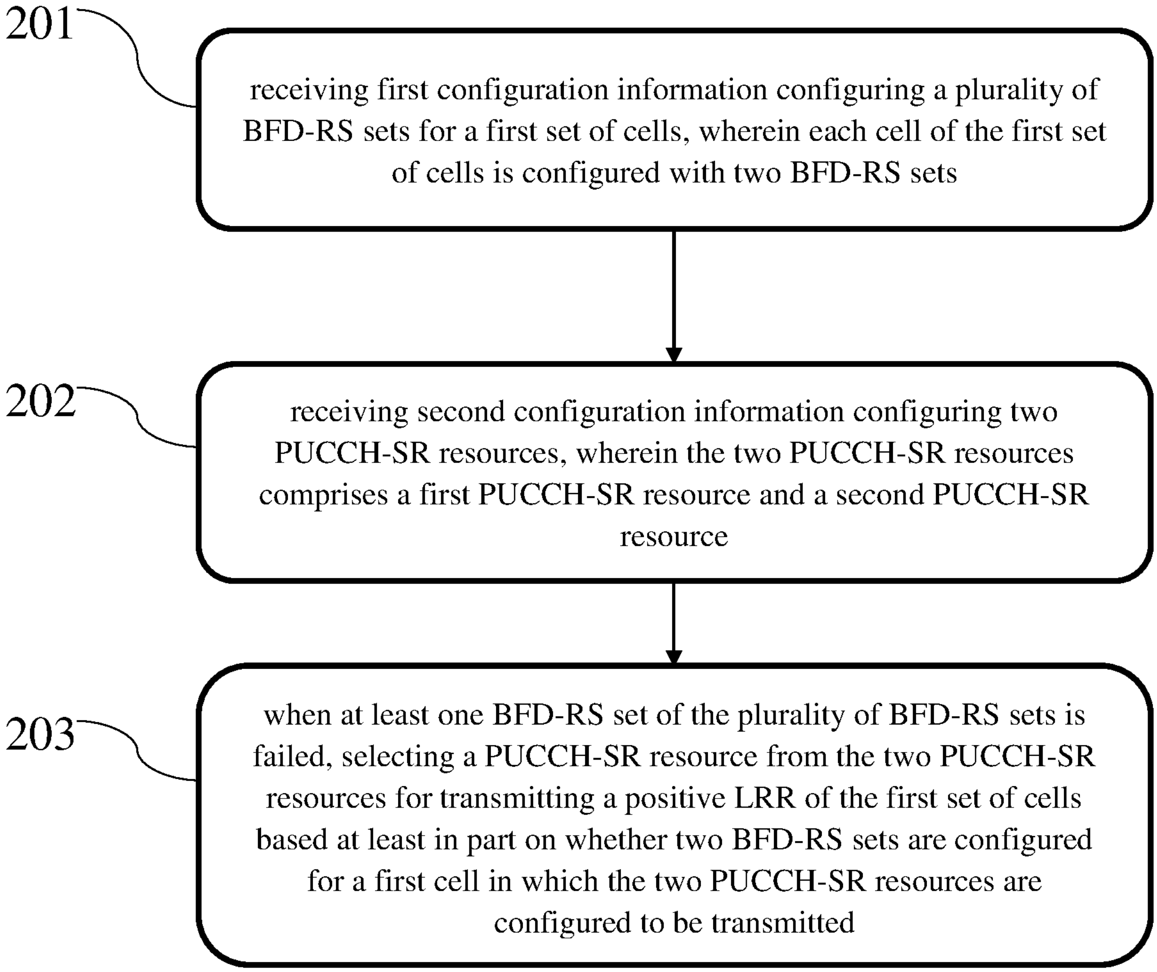
FIG. 2 illustrates a flow chart of an exemplary method for wireless communications in accordance with some embodiments of the present disclosure.

FIG. 2 illustrates a flow chart of an exemplary method for wireless communications in accordance with some embodiments of the present application. The method may be performed by a UE (e.g., the UE 102 in FIG. 1) or device(s) with similar functionality.

In step 201, the UE receives first configuration information configuring a plurality of BFD-RS sets for a first set of cells, wherein each cell of the first set of cells is configured with two BFD-RS sets. In step 202, the UE receives second configuration information configuring two PUCCH-SR resources, wherein the two PUCCH-SR resources include a first PUCCH-SR resource and a second PUCCH-SR resource. In step 203, when at least one BFD-RS set of the plurality of BFD-RS sets is failed, selecting a PUCCH-SR resource from the two PUCCH-SR resources for transmitting a positive LRR of the first set of cells based at least in part on whether two BFD-RS sets are configured for a first cell in which the two PUCCH-SR resources are configured to be transmitted. In some embodiments, the second configuration information includes one or two SR configurations.

In the present disclosure, a BFD-RS set is failed when the radio link quality of each RS in the BFD-RS set is below a predefined or configured threshold.

In some embodiments, when the first cell is not configured with two BFD-RS sets, or when the first cell is configured with two BFD-RS sets, and both of the two BFD-RS sets configured for the first cell are not failed, the UE may select any PUCCH-SR resource in the two PUCCH-SR resources. For example, in case 1 and case 2 as mentioned above, the UE may select any one of the two PUCCH-SR resources based on the UE's implementation.

In some other embodiments, in the case that the second configuration information includes one SR configuration configuring that each PUCCH-SR resource of the two PUCCH-SR resources is associated with a BFD-RS set of a first BFD-RS set and a second BFD-RS set, when the first cell is configured with a first BFD-RS set and a second BFD-RS set, and the first BFD-RS set is failed while the second BFD-RS set is not failed, a PUCCH-SR resource associated with the second BFD-RS set is selected. For example, in solution 3-1 for case 3 as mentioned above, the UE selects the PUCCH-SR resource associated with the BFD-RS set which is not failed.

In some other embodiments, in the case that the second configuration information includes a first SR configuration and a second SR configuration configuring the two PUCCH-SR resources, respectively, wherein the first SR configuration is associated with a first BFD-RS set and the second SR configuration is associated with a second BFD-RS set, when the first cell is configured with the first BFD-RS set and the second BFD-RS set, and the first BFD-RS set is failed while the second BFD-RS set is not failed, the PUCCH-SR resource configured in the first SR configuration associated with the first BFD-RS set is selected. For example, in solution 3-2 for case 3 as mentioned above, the UE selects the PUCCH-SR resource configured in the SR configuration associated with the BFD-RS set which is failed.

Figure 3:
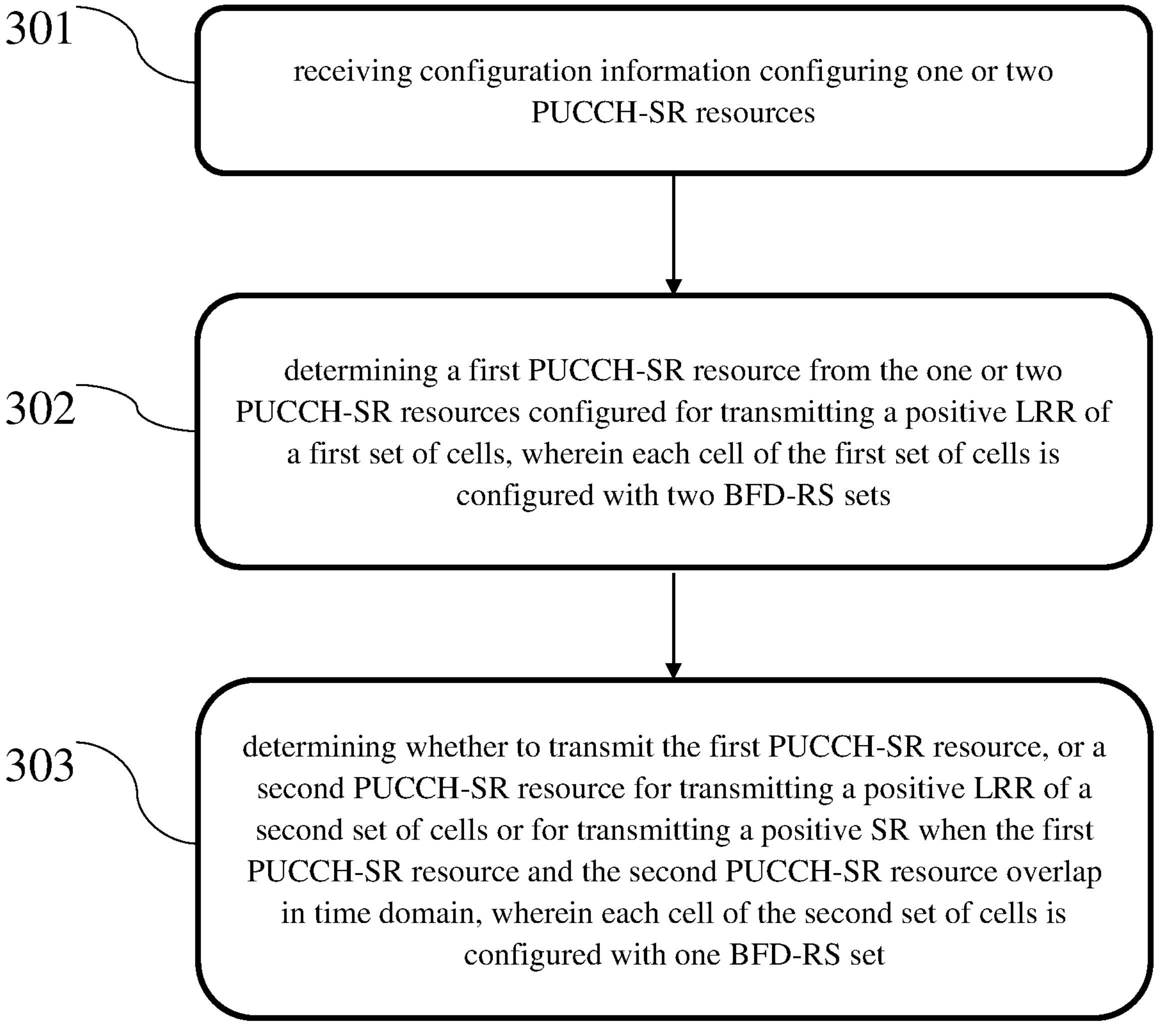
FIG. 3 illustrates a flow chart of an exemplary method for wireless communications in accordance with some embodiments of the present disclosure.

FIG. 3 illustrates a flow chart of an exemplary method for wireless communications in accordance with some embodiments of the present application. The method may be performed by a UE (e.g., the UE 102 in FIG. 1) or device(s) with similar functionality.

In step 301, the UE receives configuration information configuring one or two PUCCH-SR resources. In step 302, the UE determines a first PUCCH-SR resource, i.e. PUCCH-SR resource 1, from the one or two PUCCH-SR resources configured for transmitting a positive LRR of a first set of cells, wherein each cell of the first set of cells is configured with two BFD-RS sets. In step 303, the UE determines whether to transmit the first PUCCH-SR resource, or a second PUCCH-SR resource, i.e. PUCCH-SR resource 2, for transmitting a positive LRR of a second set of cells or for transmitting a positive SR when the first PUCCH-SR resource and the second PUCCH-SR resource overlap in time domain, wherein each cell of the second set of cells is configured with one BFD-RS set.

In some embodiments, the UE determines to transmit PUCCH-SR resource 1 when PUCCH-SR resource 2 is for transmitting the positive SR. In other words, the priority of a positive LRR of the first set of cells is higher than that of the positive SR.

In some other embodiments, the UE determines to transmit PUCCH-SR resource 2 when PUCCH-SR resource 2 is for transmitting the positive LRR of the second set of cells and the first set of cells do not include a PCell or PScell. In these embodiments, the priority of a positive LRR of the first set of cells is lower than that of the positive LRR of the second set of cells.

In some other embodiments, the UE determines whether to transmit PUCCH-SR resource 1 or PUCCH-SR resource 2 based on a lowest cell index of the first set of cells and the second set of cells when PUCCH-SR resource 2 is for transmitting the positive LRR of the second set of cells and the first set of cells do not include a PCell or PScell. This corresponds to the abovementioned option 1-2.

In some other embodiments, the UE determines whether to transmit the PUCCH-SR resource 1 or PUCCH-SR resource 2 based on a lowest cell index of a first subset of the first set of cells and a second subset of the second set of cells when PUCCH-SR resource 2 is for transmitting the positive LRR of the second set of cells, and the first set of cells do not include a PCell or PScell or two BFD-RS sets configured for the PCell or PScell are not failed, wherein at least one BFD-RS set configured for each cell of the first subset is failed, and the BFD-RS set configured for each cell of the second subset is failed. This corresponds to the abovementioned option 1-3.

In some other embodiments, the UE determines to transmit PUCCH-SR resource 2 when PUCCH-SR resource 2 is for transmitting the positive LRR of the second set of cells and the first set of cells include a PCell or PScell and two BFD-RS sets configured for the PCell or PScell are not failed. For example, the UE determines to transmit PUCCH-SR resource 2 according to the abovementioned option 2-1.

In some other embodiments, the UE determines to transmit PUCCH-SR resource 1 when PUCCH-SR resource 2 is for transmitting the positive LRR of the second set of cells and the first set of cells include a PCell or PScell. In these embodiments, the priority of the positive LRR of the first set of cells is higher than that of the positive LRR of the second set of cells.

In some other embodiments, the UE determines to transmit PUCCH-SR resource 1 when PUCCH-SR resource 2 is for transmitting the positive LRR of the second set of cells and the first set of cells include a PCell or PScell and at least one BFD-RS set configured for the PCell or PScell is failed. For example, the UE determines to transmit PUCCH-SR resource 1 according to the abovementioned option 3-1.

Figure 4:
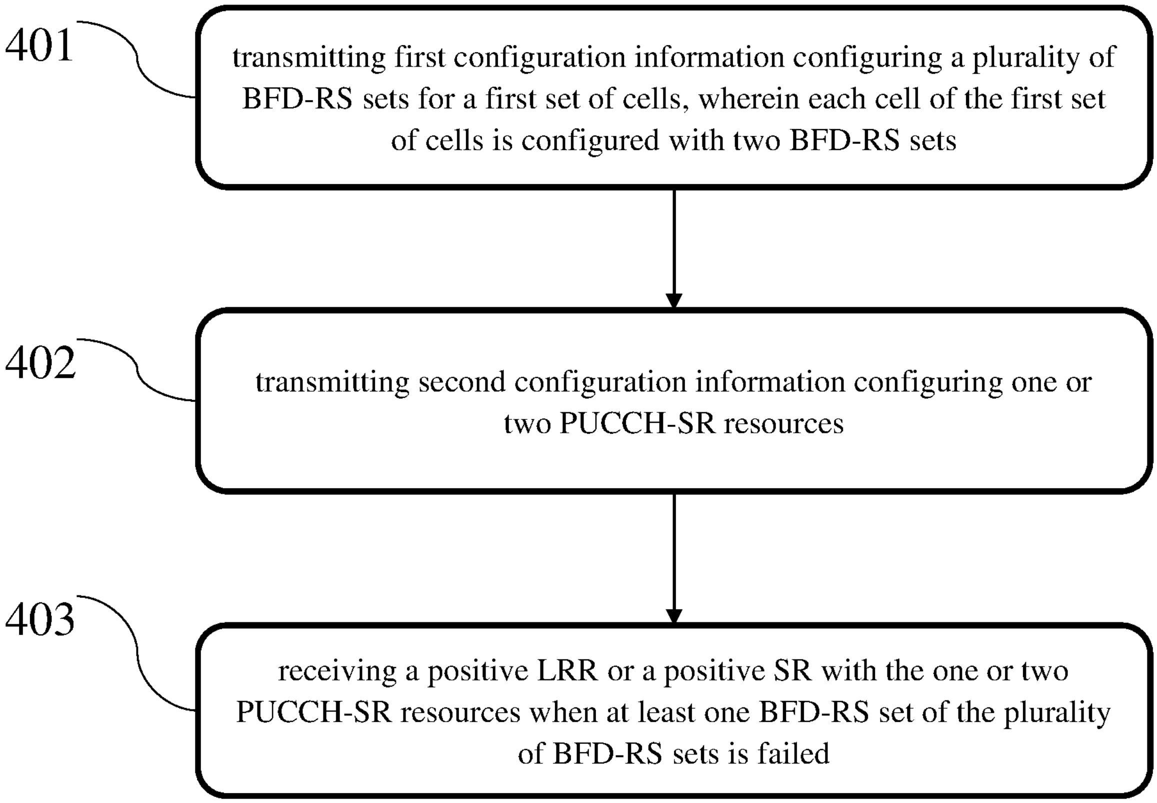
FIG. 4 illustrates a flow chart of an exemplary method for wireless communications in accordance with some embodiments of the present disclosure.

FIG. 4 illustrates a flow chart of an exemplary method for wireless communications in accordance with some embodiments of the present application. The method may be performed by a BS (e.g., the BS 101 in FIG. 1) or device(s) with similar functionality.

In step 401, the BS transmits first configuration information configuring a plurality of BFD-RS sets for a first set of cells, wherein each cell of the first set of cells is configured with two BFD-RS sets. In step 402, the BS further transmits second configuration information configuring one or two PUCCH-SR resources. In step 403, the UE receives a positive LRR or a positive SR with the one or two PUCCH-SR resources when at least one BFD-RS set of the plurality of BFD-RS sets is failed.

Figure 5:
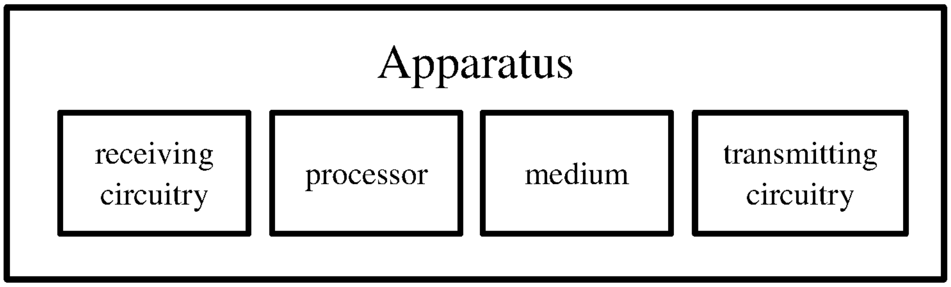
FIG. 5 illustrates a block diagram of an exemplary apparatus according to some embodiments of the present disclosure.

FIG. 5 illustrates a block diagram of an exemplary apparatus according to some embodiments of the present disclosure.

The apparatus may include a receiving circuitry, a processor, a medium and a transmitting circuitry. In some embodiments, the apparatus may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. In some embodiments, the receiving circuitry, the medium, the transmitting circuitry, and the processor may be coupled to each other via one or more local buses. The computer executable instructions can be programmed to implement a method (e.g. the method illustrated in FIG. 2, 3, or 4) with the receiving circuitry, the transmitting circuitry and the processor.

For example, in some embodiments, the apparatus may be or include a UE (e.g., the UE 102 in FIG. 1). The computer executable instructions, when executed, may cause the processor to: receive, with the receiving circuitry, first configuration information configuring a plurality of BFD-RS sets for a first set of cells, wherein each cell of the first set of cells is configured with two BFD-RS sets; receive, with the receiving circuitry, second configuration information configuring two PUCCH-SR resources, wherein the two PUCCH-SR resources include a first PUCCH-SR resource and a second PUCCH-SR resource; and when at least one BFD-RS set of the plurality of BFD-RS sets is failed, select a PUCCH-SR resource from the two PUCCH-SR resources for transmitting a positive LRR of the first set of cells based at least in part on whether two BFD-RS sets are configured for a first cell in which the two PUCCH-SR resources are configured to be transmitted.

For example, in some embodiments, the apparatus may be or include a UE (e.g., the UE 102 in FIG. 1). The computer executable instructions, when executed, may cause the processor to: receives, with the receiving circuitry, configuration information configuring one or two PUCCH-SR resources; determine a first PUCCH-SR resource from the one or two PUCCH-SR resources configured for transmitting a positive LRR of a first set of cells, wherein each cell of the first set of cells is configured with two BFD-RS sets; and determine whether to transmit the first PUCCH-SR resource, or a second PUCCH-SR resource for transmitting a positive LRR of a second set of cells or for transmitting a positive SR when the first PUCCH-SR resource and the second PUCCH-SR resource overlap in time domain, wherein each cell of the second set of cells is configured with one BFD-RS set.

For example, in some embodiments, the apparatus may be or include a BS (e.g., the BS 101 in FIG. 1). The computer executable instructions, when executed, may cause the processor to: transmit, with the transmitting circuitry, first configuration information configuring a plurality of BFD-RS sets for a first set of cells, wherein each cell of the first set of cells is configured with two BFD-RS sets; transmit, with the transmitting circuitry, second configuration information configuring one or two PUCCH-SR resources; and receive, with the receiving circuitry, a positive LRR or a positive SR with the one or two PUCCH-SR resources when at least one BFD-RS set of the plurality of BFD-RS sets is failed.

Although in FIG. 5, elements such as receiving circuitry, transmitting circuitry, medium, and processor are described in the singular, the plural is contemplated unless limitation to the singular is explicitly stated. In some embodiments of the present disclosure, the receiving circuitry and the transmitting circuitry may be combined into a single device, such as a transceiver. In certain embodiments of the present disclosure, the apparatus may further include an input device, a memory, and/or other components.

The method of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising." or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a." "an," or the like does not, without more constraints, preclude the existence of additional identical elements in the process, method, article, or apparatus that comprises the element. Also, the term "another" is defined as at least a second or more. The terms "including." "having." and the like, as used herein, are defined as "comprising."

What is claimed is:

1. A user equipment (UE) for wireless communication, comprising:

at least one memory; and at least one processor coupled with the at least one memory and configured to cause the UE to:

receive first configuration information configuring a plurality of beam failure detection reference signal (BFD-RS) sets for a first set of cells, each cell of the first set of cells configured with two BFD-RS sets;

receive second configuration information configuring two physical uplink control channel scheduling request (PUCCH-SR) resources, the two PUCCH-SR resources comprising a first PUCCH-SR resource and a second PUCCH-SR resource; and select, when at least one BFD-RS set of the plurality of BFD-RS sets is failed, a PUCCH-SR resource from the two PUCCH-SR resources for transmitting a positive link recovery request (LRR) of the first set of cells based at least in part on whether two BFD-RS sets are configured for a first cell in which the two PUCCH-SR resources are configured to be transmitted, the first cell being a primary cell (PCell) or a primary secondary cell (PSCell);

wherein, in a case that the second configuration information comprises a first SR configuration and a second SR configuration configuring the two PUCCH-SR resources, respectively, wherein the first SR configuration is associated with a first BFD-RS set and the second SR configuration is associated with a second BFD-RS set, when the first cell, which is a PCell or a PSCell, is configured with the first BFD-RS set and the second BFD-RS set, and the first BFD-RS set is failed, to select the PUCCH-SR resource the at least one processor is configured to cause the UE to select the PUCCH-SR resource configured in the first SR configuration associated with the first BFD-RS set.

2. The UE of claim 1, wherein a BFD-RS set is failed when a radio link quality of each reference signal (RS) in the BFD-RS set is below a configured threshold.

3. The UE of claim 1, wherein to select the PUCCH-SR resource, the at least one processor is configured to cause the UE to select one or more of the two PUCCH-SR resources when one or more of:

the first cell is not configured with two BFD-RS sets; or the first cell is configured with two BFD-RS sets, and both of the two BFD-RS sets configured for the first cell are not failed.

4. The UE of claim 1, wherein, in a case that the second configuration information comprises one scheduling request (SR) configuration configuring that each PUCCH-SR resource of the two PUCCH-SR resources is associated with a BFD-RS set of a first BFD-RS set and a second BFD-RS set, when the first cell is configured with a first BFD-RS set and a second BFD-RS set, and the first BFD-RS set is failed while the second BFD-RS set is not failed, to select the PUCCH-SR resource the at least one processor is configured to cause the UE to select a PUCCH-SR resource associated with the second BFD-RS set.

5. The UE of claim 1, wherein the second BFD-RS set is not failed.

6. A user equipment (UE) for wireless communication, comprising:

at least one memory; and at least one processor coupled with the at least one memory and configured to cause the UE to:

receive configuration information configuring one or more physical uplink control channel scheduling request (PUCCH-SR) resources;

determine a first PUCCH-SR resource from the one or more PUCCH-SR resources configured for transmitting a positive link recovery request (LRR) of a first set of cells, each cell of the first set of cells configured with two beam failure detection reference signal (BFD-RS) sets; and determine whether to transmit the first PUCCH-SR resource or transmit a second PUCCH-SR resource for one or more of transmitting a positive LRR of a second set of cells or transmitting a positive scheduling request (SR) when the first PUCCH-SR resource and the second PUCCH-SR resource overlap in time domain, each cell of the second set of cells configured with one BFD-RS set, wherein, in a case that the configuration information comprises a first SR configuration and a second SR configuration configuring the two PUCCH-SR resources, respectively, wherein the first SR configuration is associated with a first BFD-RS set and the second SR configuration is associated with a second BFD-RS set, when the first cell is configured with the first BFD-RS set and the second BFD-RS set, and the first BFD-RS set is failed, to select the PUCCH-SR resource the at least one processor is configured to cause the UE to select the PUCCH-SR resource configured in the first SR configuration associated with the first BFD-RS set.

7. The UE of claim 6, wherein to determine whether to transmit the first PUCCH-SR resource or transmit the second PUCCH-SR resource, the at least one processor is configured to cause the UE to determine to transmit the first PUCCH-SR resource when the second PUCCH-SR resource is for transmitting the positive SR.

8. The UE of claim 6, wherein to determine whether to transmit the first PUCCH-SR resource or transmit the second PUCCH-SR resource, the at least one processor is configured to cause the UE to determine to transmit the second PUCCH-SR resource when the second PUCCH-SR resource is for transmitting the positive LRR of the second set of cells and the first set of cells do not include a PCell or PScell.

9. The UE of claim 6, wherein to determine whether to transmit the first PUCCH-SR resource or transmit the second PUCCH-SR resource, the at least one processor is configured to cause the UE to determine whether to transmit the first PUCCH-SR resource or transmit the second PUCCH-SR resource based on a lowest cell index of the first set of cells and the second set of cells when the second PUCCH-SR resource is for transmitting the positive LRR of the second set of cells and the first set of cells do not include a PCell or PScell.

10. The UE of claim 6, wherein to determine whether to transmit the first PUCCH-SR resource or transmit the second PUCCH-SR resource, the at least one processor is configured to cause the UE to determine whether to transmit the first PUCCH-SR resource or the second PUCCH-SR resource based on a lowest cell index of a first subset of the first set of cells and a second subset of the second set of cells when the second PUCCH-SR resource is for transmitting the positive LRR of the second set of cells, and the first set of cells do not include a PCell or PScell or two BFD-RS sets configured for the PCell or PScell are not failed, wherein at least one BFD-RS set configured for each cell of the first subset is failed, and the BFD-RS set configured for each cell of the second subset is failed.

11. The UE of claim 6, wherein to determine whether to transmit the first PUCCH-SR resource or transmit the second PUCCH-SR resource, the at least one processor is configured to cause the UE to determine to transmit the second PUCCH-SR resource when the second PUCCH-SR resource is for transmitting the positive LRR of the second set of cells and the first set of cells include a PCell or PScell and two BFD-RS sets configured for the PCell or PScell are not failed.

12. The UE of claim 6, wherein to determine whether to transmit the first PUCCH-SR resource or transmit the second PUCCH-SR resource, the at least one processor is configured to cause the UE to determine to transmit the first PUCCH-SR resource when the second PUCCH-SR resource is for transmitting the positive LRR of the second set of cells and the first set of cells include a PCell or PScell.

13. The UE of claim 6, wherein to determine whether to transmit the first PUCCH-SR resource or transmit the second PUCCH-SR resource, the at least one processor is configured to cause the UE to determine to transmit the first PUCCH-SR resource when the second PUCCH-SR resource is for transmitting the positive LRR of the second set of cells and the first set of cells include a PCell or PScell and at least one BFD-RS set configured for the PCell or PScell is failed.

14. A processor for wireless communication, comprising:

at least one controller coupled with at least one memory and configured to cause the processor to:

receive configuration information configuring one or more physical uplink control channel scheduling request (PUCCH-SR) resources;

determine a first PUCCH-SR resource from the one or more PUCCH-SR resources configured for transmitting a positive link recovery request (LRR) of a first set of cells, each cell of the first set of cells configured with two beam failure detection reference signal (BFD-RS) sets; and determine whether to transmit the first PUCCH-SR resource or transmit a second PUCCH-SR resource for one or more of transmitting a positive LRR of a second set of cells or transmitting a positive scheduling request (SR) when the first PUCCH-SR resource and the second PUCCH-SR resource overlap in time domain, each cell of the second set of cells configured with one BFD-RS set, wherein, in a case that the configuration information comprises a first SR configuration and a second SR configuration configuring the two PUCCH-SR resources, respectively, wherein the first SR configuration is associated with a first BFD-RS set and the second SR configuration is associated with a second BFD-RS set, when the first cell is configured with the first BFD-RS set and the second BFD-RS set, and the first BFD-RS set is failed, to select the PUCCH-SR resource the at least one controller is configured to cause the processor to select the PUCCH-SR resource configured in the first SR configuration associated with the first BFD-RS set.

15. The processor of claim 14, wherein to determine whether to transmit the first PUCCH-SR resource or transmit the second PUCCH-SR resource, the at least one controller is configured to cause the processor to determine to transmit the first PUCCH-SR resource when the second PUCCH-SR resource is for transmitting the positive SR.

16. A processor for wireless communication, comprising:

at least one controller coupled with at least one memory and configured to cause the processor to:

receive first configuration information configuring a plurality of beam failure detection reference signal (BFD-RS) sets for a first set of cells, each cell of the first set of cells configured with two BFD-RS sets;

receive second configuration information configuring two physical uplink control channel scheduling request (PUCCH-SR) resources, the two PUCCH-SR resources comprising a first PUCCH-SR resource and a second PUCCH-SR resource; and select, when at least one BFD-RS set of the plurality of BFD-RS sets is failed, a PUCCH-SR resource from the two PUCCH-SR resources for transmitting a positive link recovery request (LRR) of the first set of cells based at least in part on whether two BFD-RS sets are configured for a first cell in which the two PUCCH-SR resources are configured to be transmitted, the first cell being a primary cell (PCell) or a primary secondary cell (PSCell), wherein, in a case that the second configuration information comprises a first SR configuration and a second SR configuration configuring the two PUCCH-SR resources, respectively, wherein the first SR configuration is associated with a first BFD-RS set and the second SR configuration is associated with a second BFD-RS set, when the first cell, which is a PCell or a PSCell, is configured with the first BFD-RS set and the second BFD-RS set, and the first BFD-RS set is failed, to select the PUCCH-SR resource the at least one processor is configured to cause a user equipment (UE) to select the PUCCH-SR resource configured in the first SR configuration associated with the first BFD-RS set.

17. The processor of claim 16, wherein a BFD-RS set is failed when a radio link quality of each reference signal (RS) in the BFD-RS set is below a configured threshold.

18. The processor of claim 16, wherein to select the PUCCH-SR resource, the at least one controller is configured to cause the processor to select one or more of the two PUCCH-SR resources when one or more of:

the first cell is not configured with two BFD-RS sets; or the first cell is configured with two BFD-RS sets, and both of the two BFD-RS sets configured for the first cell are not failed.

19. The processor of claim 16, wherein, in a case that the second configuration information comprises one scheduling request (SR) configuration configuring that each PUCCH-SR resource of the two PUCCH-SR resources is associated with a BFD-RS set of a first BFD-RS set and a second BFD-RS set, when the first cell is configured with a first BFD-RS set and a second BFD-RS set, and the first BFD-RS set is failed while the second BFD-RS set is not failed, to select the PUCCH-SR resource the at least one processor is configured to cause a user equipment (UE) to select a PUCCH-SR resource associated with the second BFD-RS set.

20. The processor of claim 16, wherein the second BFD-RS set is not failed.

* * * * *